United States Patent
Meetz et al.

(10) Patent No.: US 8,811,703 B2
(45) Date of Patent: Aug. 19, 2014

(54) PERFUSION IMAGING

(71) Applicant: Koninklijke Philips N. V., Eindhoven (NL)

(72) Inventors: Kirsten R. Meetz, Hamburg (DE); Hans-Dieter Nagel, Buchholtz (DE)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 13/938,297

(22) Filed: Jul. 10, 2013

(65) Prior Publication Data

US 2013/0294672 A1 Nov. 7, 2013

Related U.S. Application Data

(62) Division of application No. 12/996,987, filed as application No. PCT/IB2009/052289 on May 29, 2009, now Pat. No. 8,509,507.

(60) Provisional application No. 61/076,725, filed on Jun. 30, 2008.

(51) Int. Cl.
  *G06K 9/00* (2006.01)
  *G06T 7/00* (2006.01)
  *G06T 11/00* (2006.01)

(52) U.S. Cl.
  CPC ............ *G06T 11/003* (2013.01); *G06T 7/0012* (2013.01); *G06T 2207/30168* (2013.01); *G06T 2207/30016* (2013.01); *G06T 2207/10081* (2013.01)
  USPC ............................................. 382/128; 378/4

(58) Field of Classification Search
  USPC ................. 382/100, 128, 129, 130, 131, 132; 128/922; 378/4–27
  See application file for complete search history.

(56) References Cited

U.S. PATENT DOCUMENTS

| | | | |
|---|---|---|---|
| 6,650,928 B1 * | 11/2003 | Gailly et al. | 600/425 |
| 7,394,920 B2 * | 7/2008 | Ficaro et al. | 382/128 |
| 7,738,626 B2 * | 6/2010 | Weese et al. | 378/41 |
| 7,774,041 B2 * | 8/2010 | Nambu et al. | 600/407 |
| 8,326,400 B2 * | 12/2012 | Taxt et al. | 600/420 |
| 2007/0016016 A1 * | 1/2007 | Haras et al. | 600/431 |
| 2008/0075344 A1 * | 3/2008 | Nambu et al. | 382/131 |
| 2008/0262344 A1 | 10/2008 | Brummett | |
| 2008/0294038 A1 * | 11/2008 | Weese et al. | 600/431 |

OTHER PUBLICATIONS

Kealey, S. M., et al.; User-defined Vascular Input Function Curves: Influence on Mean Perfusion Parameter Values and Signal-to-Noise Ratio; 2004; Radiology; 231:587-593.

Mouridsen, K., et al.; Automatic selection of arterial input function using cluster analysis; 2004; American Journal of Neuroradiology; 25(1)abstract.

Nichols, K., et al.; Feasibility of detecting cardiac torsion in myocardial perfusion gated SPECT data; 2002; Journal of Nuclear Cardiology; 9(5)500-507.

(Continued)

*Primary Examiner* — Anand Bhatnagar

(57) ABSTRACT

A method includes determining a plausibility of one or more perfusion parameter maps generated based on perfusion image data and correcting at least one of the perfusion parameter maps when the plausibility for the at least one perfusion parameter map does not satisfy pre-set perfusion parameter plausibility criteria.

17 Claims, 8 Drawing Sheets

(56) References Cited

OTHER PUBLICATIONS

Sanelli, P. C., et al.; Reproducibility of Postprocessing of Quantitative CT Perfusion Maps; 2007; American Journal of Roentgenology; http://www.ajronline.org/cgi/content/full/188/1/213.

Shetty, S. K., et al.; CT Perfusion in Acute Stroke; 2005; Seminars in Ultrasound, CT, and MR; 26(6)404-421.

Spreeuwers, L. J., et al.; Optimal Myocardial Boundary Estimation for MR Cardio Perfusion Measurements Using Sensitivity Analysis; 2002; Computers in Cardiology; 29:197-200.

Wintermark, M.; Brain Perfusion Computed Tomography for the Management of Acute Stroke Patients; 2005; Business Briefing: US Neurology Review; pp. 1-3.

* cited by examiner

PERFUSION IMAGING

CROSS REFERENCE TO RELATED APPLICATIONS

This application is a divisional of U.S. application Ser. No. 12/996,987 filed Dec. 9, 2010 which is a national filing of PCT application Serial No. PCT/IB2009/052289, filed May 29, 2009, published as WO 2010/001280 A1 on Jan. 7, 2010, which claims the benefit of U.S. provisional application Ser. No. 61/076,725 filed Jun. 30, 2008, which is incorporated herein by reference.

DESCRIPTION

The following generally relates to perfusion imaging, and finds particular application to computed tomography perfusion (CTP). However, it also amenable to other medical imaging applications and to non-medical imaging applications.

Computed tomography perfusion (CTP) provides information that can be used to facilitate diagnosing patients with mal-perfusion of the brain like stroke patients. In general, a typical CTP procedure includes intravenously administering a contrast agent bolus to a patient. The patient's brain is then scanned. The contrast agent causes the x-ray density of the brain to temporarily increase as the contrast agent flows through and washes out of the vascular structure of the brain. Data is captured and images are generated for different time intervals to trace the contrast agent as it flows through the vascular structure of the brain. The resulting data can be used to identify ischemic tissue and/or differentiate between irreversibly damaged tissue (necrotic tissue, or the core of the infarct) and potentially reversibly damaged tissue (at-risk tissue, or the penumbra of the infarct), for example, in stroke patients.

Software application perfusion packages provide tools that facilitate automatically or semi-automatically interpreting such CTP image data. Such packages may generate graphical perfusion parameter maps showing cerebral blood flow (CBF), cerebral blood volume (CBV), mean transit time (MTT) and time to peak (TTP) maps, and summary maps, based on the perfusion parameter maps, which show areas of hypo-perfusion in the brain. These maps help identify the core and the penumbra of an infarct and may impact the therapeutic decision making, for example, where the percentage of the core to the total area (core plus penumbra) is used to decide whether thrombolytic or other therapy should be applied in an attempt to save the potentially reversibly damaged tissue (the penumbra).

The quality of the information in the perfusion parameter and summary maps depends on the quality of the representation of the selected vessel (artery and/or vein) in the image data. However, artifact, such as partial volume averaging of a small vessel in relatively thicker slices, may lead to inaccuracies in the vessel representation, which may lead to the selection of inappropriate reference vessels for generating the maps, resulting in inaccurate perfusion parameter and summary maps, and potentially erroneous therapeutic decisions. The perfusion parameter and summary maps have been manually corrected by the clinician, for example, via changing parameter values, to compensate for visually observed differences in the left and right and/or front and back hemispheres of the brain. Unfortunately, such corrections can be time consuming and prone to human error.

Aspects of the present application address the above-referenced matters and others.

According to one aspect, a method includes determining a plausibility of one or more perfusion parameter maps generated based on perfusion image data and correcting at least one of the perfusion parameter maps when the plausibility for the at least one perfusion parameter map does not satisfy pre-set perfusion parameter plausibility criteria.

According to another aspect, a system includes a perfusion parameter map validator that corrects one or more perfusion parameter maps generated based on perfusion image data, and a summary map validator that corrects one or more summary maps generated based on the one or more perfusion parameter maps.

According to another aspect, a computer readable storage medium containing instructions which, when executed by a computer, cause the computer to perform the steps of: determining a plausibility of at least one of a first perfusion parameter map generated based on perfusion image data or a summary map based on a second perfusion parameter map, and correcting the at least one of the first perfusion parameter map or the summary map when the at least one of the first perfusion parameter map or the summary map does not satisfy pre-set plausibility criteria.

The invention may take form in various components and arrangements of components, and in various steps and arrangements of steps. The drawings are only for purposes of illustrating the preferred embodiments and are not to be construed as limiting the invention.

Figure 1:
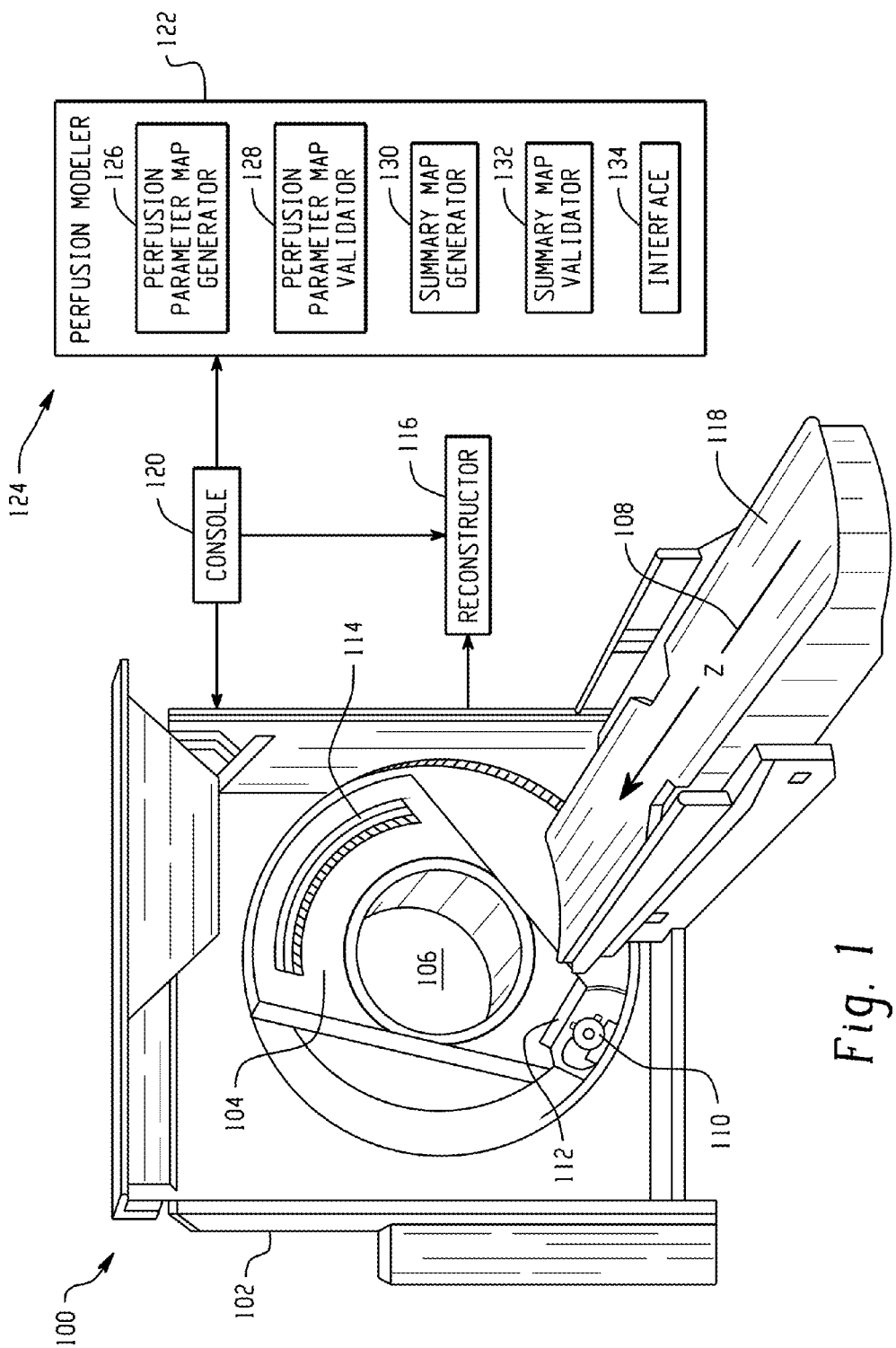
FIG. 1 illustrates an example perfusion modeler in connection with an imaging system.

FIG. 1 illustrates a computed tomography (CT) scanner 100 that includes a stationary gantry 102 and a rotating gantry 104, which is rotatably supported by the stationary gantry 102. The rotating gantry 104 rotates around an examination region 106 about a longitudinal or z-axis 108. A radiation source 110, such as an x-ray tube, is supported by and rotates with the rotating gantry 104 around the examination region 106. The radiation source 110 emits radiation, which is collimated by a collimator 112 to produce a generally fan, wedge, or cone shaped radiation beam that traverses the examination region 106.

A radiation sensitive detector array 114 detects photons that traverse the examination region 106 and generates projection data indicative thereof. A reconstructor 116 reconstructs the projection data and generates volumetric image data indicative of the examination region 106, including a portion of a subject residing therein. A patient support 118, such as a couch, supports the patient for the scan. A general purpose computing system 120 serves as an operator console. Software resident on the console 120 allows the operator to control the operation of the system 100.

In one instance, the scanner 100 is used to perform a CT perfusion (CTP) procedure of the brain or other vascular tissue. Such a procedure may include administering a contrast medium bolus, such as an intravenous iodinated contrast agent, to a subject, and then scanning the subject's brain over time. Following the administration of the contrast medium bolus, the x-ray density of the brain temporarily changes as the contrast medium flows through the vascular structure of the brain (e.g., uptake through wash out). The contrast material is traced as it passes through the vascular structure of the brain via multiple scans. The resulting CTP image data can be used to identify ischemic tissue and/or differentiate between irreversibly damaged tissue and potentially reversibly damaged tissue, for example, in stroke patients or patients with another neuro-vascular disease. Of course, the scanner 100 can additionally or alternatively be used for other CT applications.

A perfusion modeler 122 generates cerebral perfusion information based at least in part on CTP image data. In one instance, a perfusion parameter map generator 126 generates one or more perfusion parameter maps for information such as mean transit time (MTT), cerebral blood volume (CBV), cerebral blood flow (CBF), time to peak (TTP), and/or one or it more other parameters. A perfusion parameter map validator 128 performs a plausibility check on a map and facilitates correcting a map, if needed, and validating a map that passes the plausibility check.

A summary map generator 130 generates a summary map based on one or more of the perfusion parameters maps, and a summary map validator 132 facilitates correcting a summary map, if needed, and validating a summary map that pass the plausibility check. As noted above, a summary map can be used to identify the core and/or the penumbra of an infarct. In other embodiments, the summary map validator 132 does not facilitate correcting summary maps.

An interface 134 provides a mechanism through which an operator and the perfusion modeler 122 interact. Such interaction may include presenting various information, via a monitor or the like, such as the CTP data, CTA data, data from another imaging modality(s), and/or a combination thereof, one or more of the perfusion parameter maps, indicia indicating the veracity of a perfusion parameter map, one or more of the summary maps, indicia indicating the veracity of a summary map, and/or other information. Such interaction may also include operator input such as vessel selection, auto-correction invocation, parameter values, thresholds, acceptance criteria, etc.

It is to be appreciated that the perfusion modeler 122 may be configured to automatically generate parameter and/or summary maps, validate parameter and/or summary maps, correct the information used to generate the maps, provide notifications about the maps, and/or perform other functions and/or provide other information. As such, in one instance the perfusion modeler 122 may facilitate mitigating generating parameter and/or summary maps that may lead to erroneous therapeutic decisions by performing a plausibility check on the parameter and/or summary maps and an automatic correction thereof, when needed, and notifying the operator regarding the results of the plausibility check and correction. As such, the clinician may not have to visually inspect and manually correct map parameters, which may mitigate introducing human error into the maps and consuming time.

Figure 2:
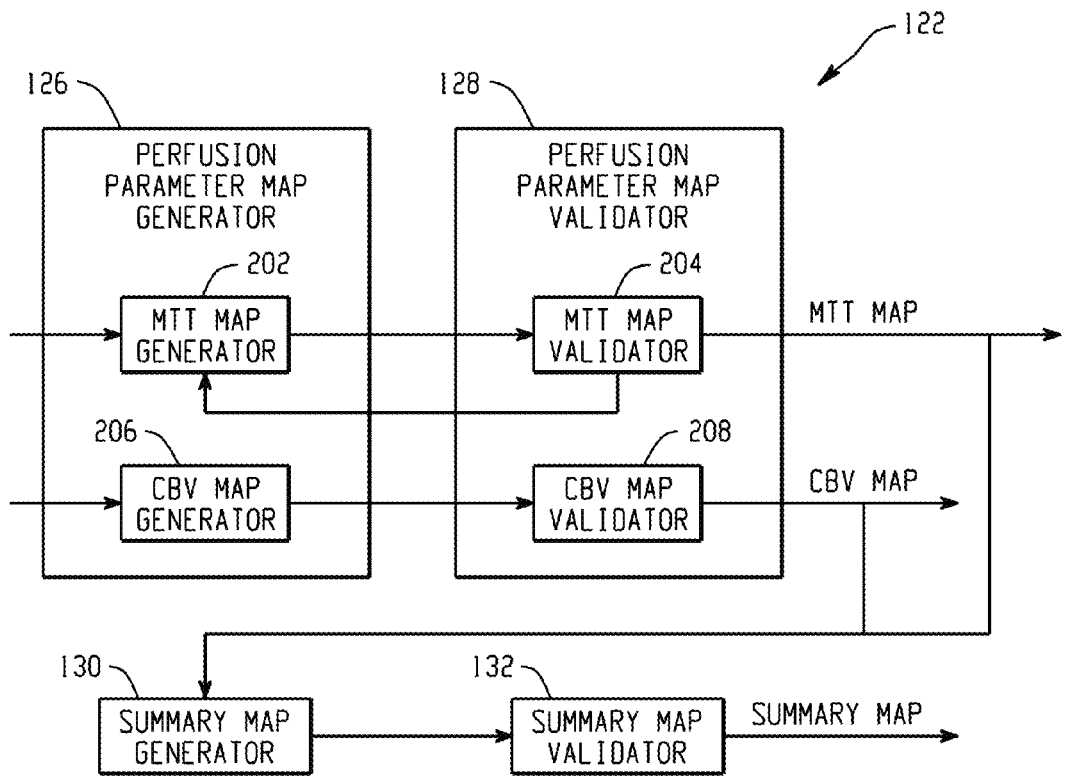
FIG. 2 illustrates various example components of the perfusion modeler.

FIG. 2 illustrates a non-limiting example perfusion modeler 122. As briefly discussed above, the perfusion parameter map generator 126 generates perfusion parameter maps, including, but not limited to, a perfusion parameter map for MTT and/or a perfusion map for CBV. The following provides examples of MTT parameter map and CBV parameter map generators. Parameter map generators for other perfusion information may also be included.

In the illustrated example, the perfusion parameter map generator 126 includes a MTT map generator 202 that generates a MTT map. The MTT map generator 202 generates a MTT map based on CTP image data, for example, CTP image data from the scanner 100, based on at least one reference artery of the brain represented in the CTP image data. In one instance, an operator selects the reference artery and/or the reference vein, which may be a vein at the back of the head such as the superior sagittal sinus or other vein. In another instance, a computer implemented algorithm automatically selects the artery and/or vein. The operator may override the automatic selection.

A MTT map validator 204 validates the generated MTT map. A MTT map that fails validation may be discarded and/or presented with a notification indicating lack of validation. Alternatively, and as described in greater detail below, when a MTT map fails to be validated, one or more new MTT maps can be iteratively generated by the MTT map generator 202 until a MTT map is validated or some other criteria is satisfied. A validated MTT map may be presented to the operator, for example, via the interface 134 and/or otherwise. A non-validated MTT map may also be presented, however, with a warning and/or other notification.

The perfusion parameter map generator 126 also includes a CBV map generator 206 that generates CBV maps. The CBV map generator 206 uses CTP image data, for example, from the scanner 100, to generate a CBV map. A CBV map validator 208 validates the CBV map. As described in greater detail below, this may include determining one or more features, such as a texture or gradient, from the image data and validating the CBV map based on at least one of the one or more features.

A CBV map that fails to be validated may be discarded and/or presented with a notification indicating lack of validation. Alternatively, and as described in greater detail below, when a CBV map fails to be validated, one or more corrections can be iteratively performed until the CBV map is validated or some other criteria is satisfied. A validated CBV map may be presented to the operator via the interface 134 and/or otherwise. A non-validated CBV map may also be presented, however, with a warning and/or other notification.

The summary map generator 130 generates a summary map. In one instance, a summary map is generated based on a MTT map. Such a summary map can be used to determine the penumbra of the infarct. Additionally or alternatively, the summary map is generated based on a CBV map. In this instance, the summary map can be used to determine the core of the infarct. When the MTT and/or CBV map are corrected, the summary map is generated based on the corrected MTT and/or CBV map, and a corrected threshold, as described in greater detail below. The summary map validator 132 validates the summary map. Similar to the MTT and CBV maps, a summary map may be presented to the operator. In instances where the summary map is not validated, a warning and/or other notification may be presented therewith.

Figure 3:
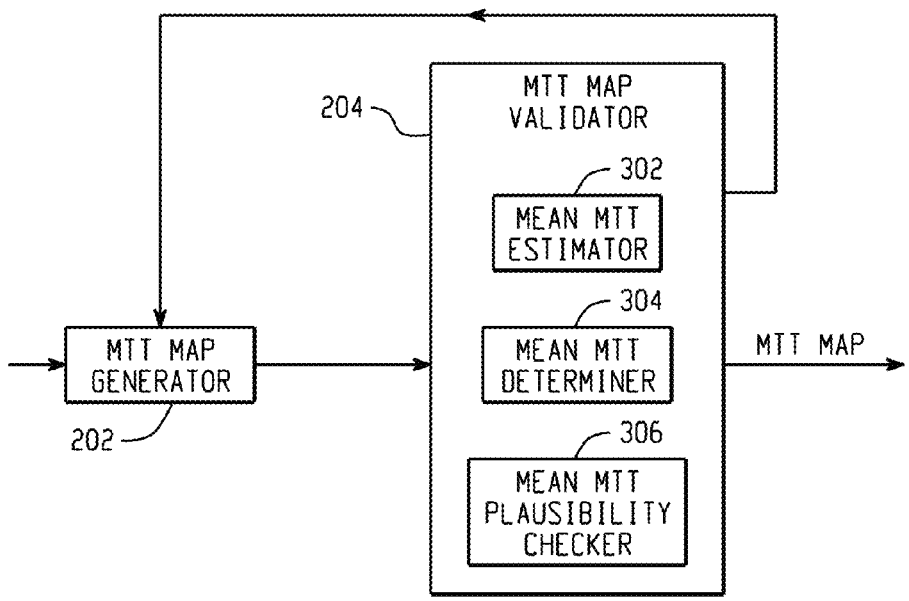
FIG. 3 illustrates an example MTT validator of the perfusion modeler.

FIG. 3 illustrates a non-limiting example of the MTT validator 204 in connection with the MTT map generator 202. In the illustrated embodiment, the MTT validator 204 includes a mean MTT estimator 302, a mean MTT determiner 304, and a mean MTT plausibility checker 306.

In one instance, the mean MTT estimator 302 estimates a mean MTT by deriving a mean MTT from a time difference between the arterial and the venous peak of contrast flow in the selected artery and veins. The time difference may be calculated from the maximums of time concentration curves for the reference artery and vein, for example, from the time difference therebetween. Generally, this time difference represents the time of contrast flow from the reference artery to the reference vein.

Figure 4:
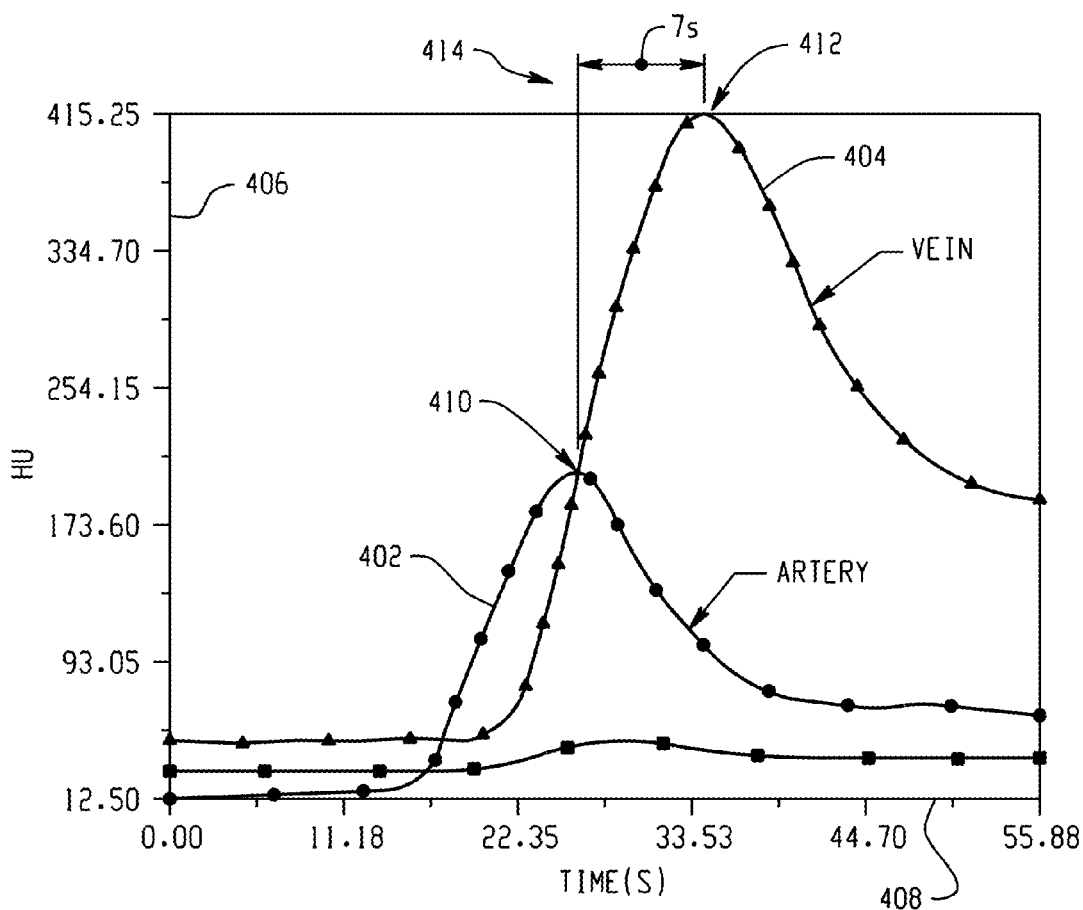
FIG. 4 illustrates an example time concentration curves.

FIG. 4 shows superimposed time concentration curves 402 and 404 respectively for a referenced artery and a reference vein. In FIG. 4, a y-axis 406 represents contrast concentration as a function of time and an x-axis 408 represents time. The time difference can be derived from FIG. 4 as a function of Equation 1:

$$\Delta T = \max(TCC_V) - \max(TCC_A), \quad \text{EQUATION 1:}$$

where time difference $\Delta T$ represents the estimated mean MTT, $\max(TCC_V)$ is about a maximum 412 of the time concentration curve of the reference vein, and $\max(TCC_A)$ is about a maximum 410 of the time concentration curve of the reference artery. In FIG. 4, $\Delta T$=seven (7) seconds, as indicated at 414.

Returning to FIG. 3, the mean MTT determiner 304 determines a mean MTT from the MTT parameter map generated by the MTT map generator 202. In this example, the mean MTT is for the brain and is determined as a function of Equation 2:

$$MTT_{mean} = \sum_{i=1}^{N_B} MTT(p_i), \quad \text{EQUATION 2}$$

where $N_B$ is a number of pixels in a region of interest in the image data in the brain and $p_i$ is the ith pixel within the brain.

The MTT parameter map plausibility checker 306 determines the plausibility of the MTT parameter map based on the determined mean MTT and the estimated mean MTT. For instance, the mean plausibility checker 306 may compare an absolute difference between $\Delta T$ and $MTT_{mean}$ against a pre-set threshold in accordance with Equation 3:

$$\Delta MTT = |MTT_{mean} - \Delta T| < Thresh_{MTT} \quad \text{EQUATION 3:}$$

where $Thresh_{MTT}$ is the pre-set threshold (e.g., one (1)-two (2) seconds). Generally, the mean MTT for a "normal" patient is about five (5) seconds, and a MTT greater then that may indicate inhibited blood flow, for example, due to an obstruction or otherwise.

The MTT validator 204 validates and passes the MTT map when $\Delta MTT < Thresh_{MTT}$. Otherwise, the MTT validator 204 notifies the MTT map generator 202, which generates another MTT map and, optionally, presents a notification, indicating that the MTT failed the plausibility test. The MTT map generator 202 generates a new MTT map based on another reference artery, which may be manually selected by an operator or automatically selected. A new MTT map is then generated based on the newly selected artery. The above validation can then be performed on the new MTT. New arteries are selected and new MTT maps are generated until $\Delta MTT$ is less than $Thresh_{MTT}$, or some other criteria is satisfied.

Figure 5:
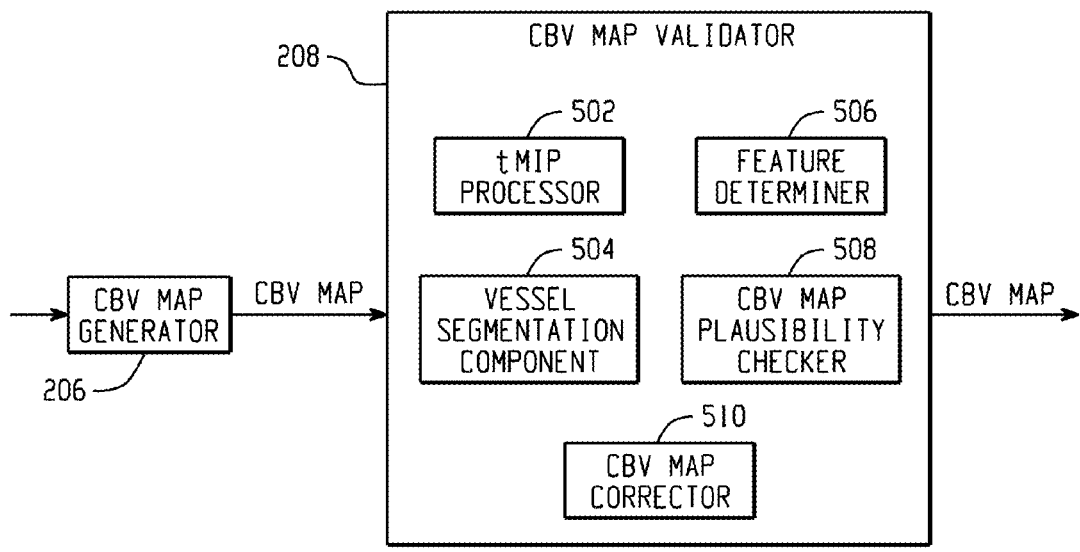
FIG. 5 illustrates an example CBV validator of the perfusion modeler.

FIG. 5 illustrates a non-limiting example of the CBV validator 208 in connection with the CBV map generator 206. In the illustrated embodiment, the CBV validator 208 includes a Maximum Intensity Projection (MIP) processor 502, a vessel segmentation component 504, a feature determiner 506, a CBV map plausibility checker 508, and a CBV map corrector 510.

Figure 6:
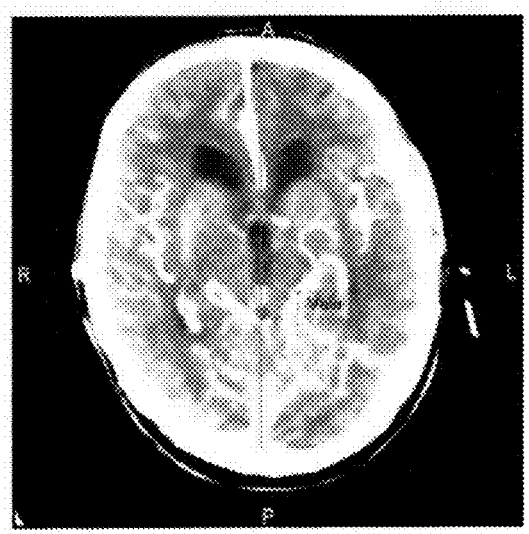
FIG. 6 illustrates an example tMIP image data.

The MIP processor 502 generates temporal MIP (tMIP) image data, which shows the maximal value for each pixel during the uptake and washout of the contrast agent. The tMIP images are calculated based on CTP image data. By way of example, the image data may include the superposition of thirty (30) images acquired over sixty (60) seconds(s). FIG. 6 illustrates an example tMIP image data.

The vessel segmentation component 504 determines a first set of vessels to segment or remove based on the CBV map generated by the CBV map generator 206. In one instance, the first set of vessels is based on a default threshold. For example, the first set of vessels may relate to tissue in the CBV map having a value greater than a default threshold of nine (9) milliliters (ml) of blood per one hundred (100) grams (g) of brain mass.

A feature determiner 506 determines various features from the data. For instance, the feature determiner 506 can determine a mean gradient based on the tMIP and the first set of vessels. In one instance, this includes generating masked image data by masking the tMIP image data with the first set of vessels, and then determining the mean gradient of the masked image data. The original pixel values of the tMIP image data at the position of the mask vessel are retained and the other pixel values are set to zero.

By way of non-limiting example, the masked image data can be generated, for example, as a function of Equation 4:

$$tMIP_{masekd} = tMIP * vessel_1, \quad \text{EQUATION 4:}$$

where $tMIP_{masked}$ is the masked tMIP image data and $vessel_1$ represents the first set of vessels, and a mean gradient of the masked image data can be determined, for example, as a function of Equation 5:

$$g(tMIP_{masked}) = \frac{\sum_{i=1}^{N_v} g(p_i)}{N_v}, \quad \text{EQUATION 5}$$

where $g(tMIP_{masked})$ is the mean gradient of the masked image, $g(p_i)$ is the ith gradient, and $N_v$ is the number of pixels $p_i$ within the mask $vessel_1$, excluding all pixels at the border of the mask.

In this example, the CBV parameter map plausibility checker 508 determines the plausibility of the CBV parameter map based on the mean gradient $g(tMIP_{masked})$. For instance, the mean plausibility checker 508 may compare the mean gradient $g(tMIP_{masked})$ with a pre-set threshold in accordance with Equation 6:

$$g(tMIP_{masked}) < Thresh_{CBV} \quad \text{EQUATION 6:}$$

where $Thresh_{CBV}$ is the pre-set threshold.

Figure 7:
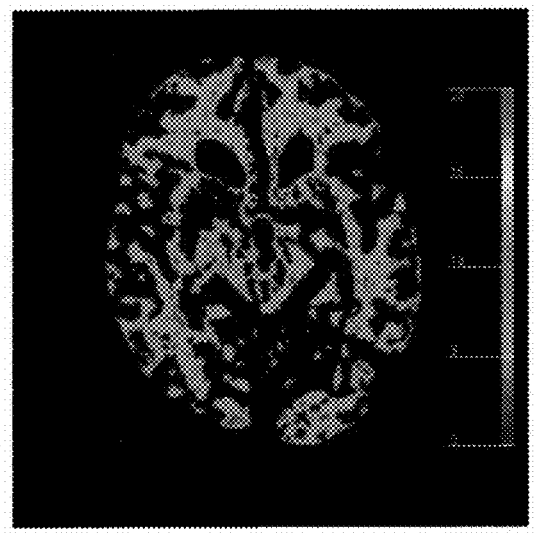
FIG. 7 illustrates an example erroneous CBV parameter map.

The CBV validator 208 validates the CBV map when $g(tMIP_{masked}) < Thresh_{CBV}$. Otherwise, a CBV corrector 510 corrects the CBV map and, optionally, presents a notification, indicating that the CBV failed the plausibility test. Generally, in this case the segmented area is too big and not only vessels but a portion of the brain tissue is also removed from the CBV map a shown in FIG. 7 relative to FIG. 6.

The CBV corrector 510 may perform an auto-correction, which, in one non-limiting instance, includes re-sizing or shrinking the vessel mask. This can be achieved by applying an erosion kernel that scales the mask, an erosion kernel that discards or ignores an outer perimeter layer of the mask to reduce the mask, and/or other erosion kernels. This correction can be repeated until (tMIP$_{masked}$)<Thresh$_{CBV}$ and/or otherwise.

When the above correction results in (tMIP$_{masked}$)> Thresh$_{CBV}$, the default segmentation threshold can be updated to reflect a threshold that would render (tMIP$_{masked}$)< Thresh$_{CBV}$. The corrected segmentation threshold can be determined as a function of Equation 7:

$$\text{Thresh}_{COR} = \frac{\sum_{i=1}^{N_{vessel_{1\_ero}}} CBV(p_i)}{N_{vessel_{1\_ero}}} \quad \text{EQUATION 7}$$

where $p_i$ is the ith pixel within vessel$_{1\_ero}$.

Figure 8:
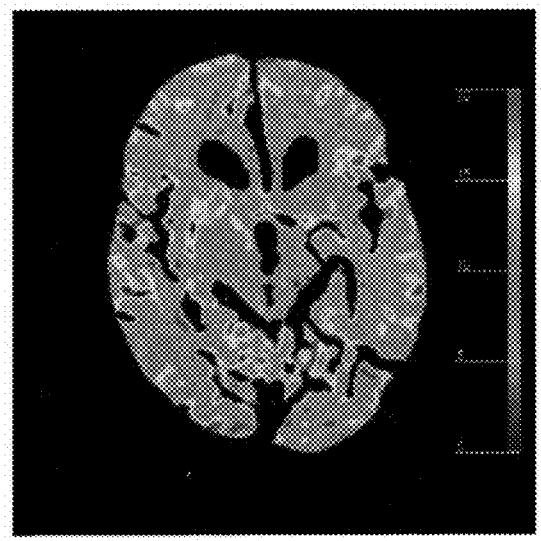
FIG. 8 illustrates an example corrected CBV parameter map.

The corrected threshold, Thresh$_{COR}$, is used to remove the vessels from the corrected CBV map. FIG. 8 shows a corrected CBV map for the tMIP image data of FIG. 6, applying the corrected Thresh$_{COR}$. Note that the segmented portions of the corrected map in FIG. 8 more closely represent the vessels in FIG. 6 relative to FIG. 7.

Figure 9:
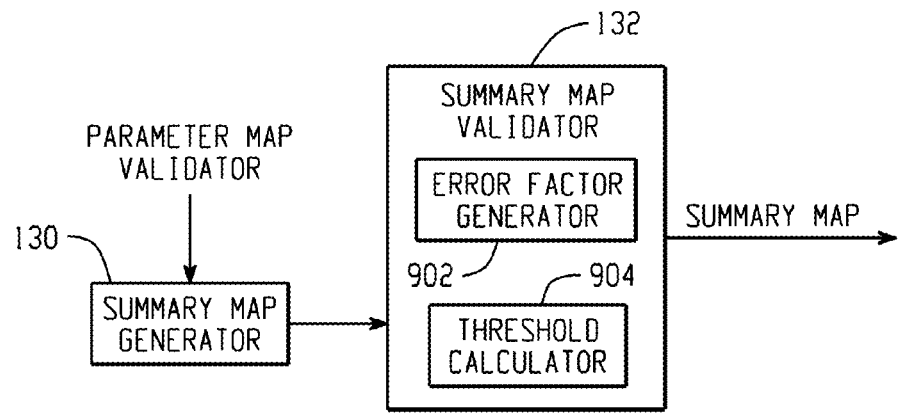
FIG. 9 illustrates an example summary map validator of the perfusion modeler.

FIG. 9 illustrates a non-limiting example of the summary map validator 132. The summary map validator 132 receives the summary map generated by the summary map generator 130 and information from the parameter map validator 128 regarding the MTT and/or CBV map, for example, the MTT and/or CBV map, an indication of whether the originally generated MTT and/or CBV map has been corrected, any correction, etc. Generally, the correction of the threshold for the vessel removal is an indication that the values of the MTT and/or CBV map are erroneous. When the CBV map is corrected, an error factor generator 902 of the summary map validator 132 generates an error factor as a function of Equation 8:

$$c = \frac{thresh_{CBV}}{thresh_{DEFAULT}} \quad \text{EQUATION 8}$$

where c is the correction factor, thresh$_{CBV}$ is the mean CBV value of the vascular structure (Equation (7)), and thresh$_{DEFAULT}$ is the default segmentation threshold, which is 9 ml/100 g in our above example.

A threshold calculator 904 calculates a corrected threshold for determining the core of the infarct based on the error factor. For instance, the threshold calculator 904 can calculate the threshold as a function Equation 9:

Thresh$_{CORE}$=c*2 ml/100 g        EQUATION 9:

where Thresh$_{CORE}$ is the core threshold. Thresh$_{CORE}$ is used to correct the summary map.

Variations and/or alternatives are discussed.

In the illustrated embodiment, the perfusion modeler 122 is part of a workstation 124 or the like, which is separate from the scanner 100. In other embodiments, the perfusion modeler 122 is additionally or alternatively implemented in the console 120 and/or another system.

In connection with FIG. 5 above, the CBV map is corrected by adjusting a size of the segmentation mask. In another embodiment, when the gradient g(tMIP$_{masked}$) is greater than the pre-set threshold Thresh$_{CBV}$, the correction component 510 auto-corrects the CBV map by directly modifying the default segmentation threshold. For instance, the default segmentation threshold can be automatically scaled by a factor (e.g., two (2)), incremented by one or more units (e.g., one (1) ml/one hundred (100) g), and/or otherwise changed. By way of non-limiting example, the default segmentation threshold can be scaled by a factor of two (2), resulting in a segmentation threshold of eighteen (18) ml/one hundred (100) g, assuming a default threshold of nine (9) ml/one hundred (100) g.

The CBV map may also be validated using CTA image data. For example, if CTA image data is available, the CTA image data and the tMIP image data can be registered, and the CTA image data can be used to describe the vessel. If the CTA image data is acquired at a higher dose and higher spatial resolution, relative to the CT imaged data used to generate the tMIP imaged data, the CTA image may have better noise statistics and includes thinner slices, mitigating partial volume artifacts. As a result, the segmentation can be improved.

The tMIP image data may be generated as described herein. However, alternatively the vessel segmentation component 504 generates a first set of vessels, vessel$_1$, for example, by performing a threshold-based segmentation to the pixels of a brain region of interest of the tMIP images and a second set of vessels, vessel$_2$, for example, by performing a vessel segmentation to the CTA image data registered with the CTP images. Other segmentation approaches can alternatively be applied.

The CBV parameter map plausibility checker 508 compares the absolute difference of the area of vessel$_1$ and the area of vessel$_2$. If the difference of the area (number of equally scaled pixels) classified as vessel$_1$ respectively as vessel$_2$ exceeds a given threshold, the auto-correction can be performed as discussed above. However other criterion may be used to stop the iterative auto-correction. For example, the auto-correction may be performed until the difference between the eroded mask vessel$_{1\text{-}ero}$ and the mask vessel$_2$ is below a given threshold. As described above, the eroded mask vessel$_{1\text{-}ero}$ can be used to define the corrected CBV threshold Thresh$_{CORE}$.

Figure 10:
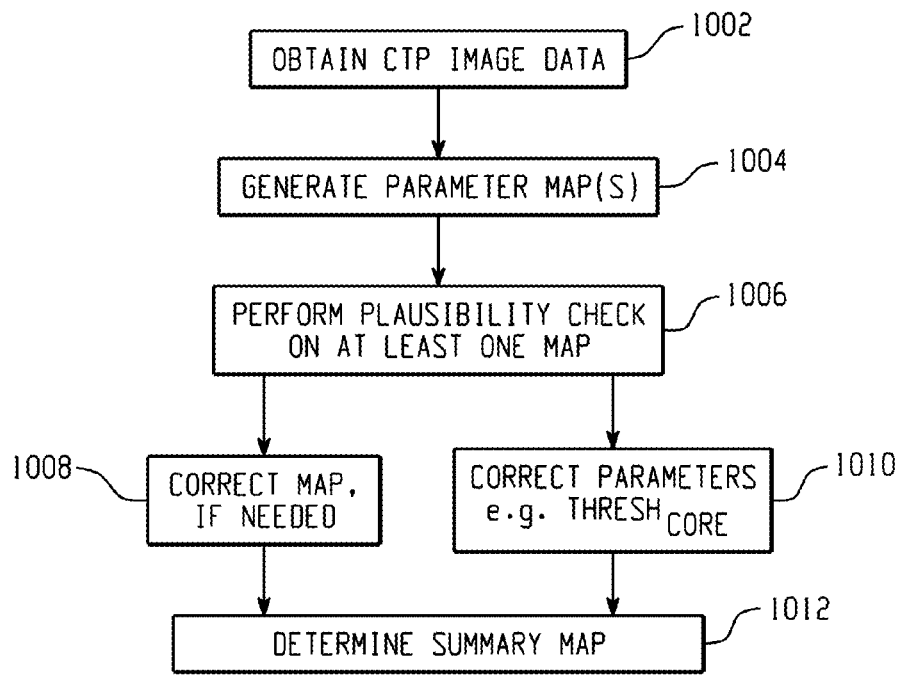
FIG. 10 illustrates an example method for validating perfusion parameter and summary maps.

FIG. 10 illustrates a non-limiting method for validating perfusion parameter and summary maps. At 1002, CTP image data is obtained. As briefly discussed above, such data can captured by the scanner 100. Additionally or alternatively, perfusion information can be obtained from another imaging modality such as MR, US, SPECT, PET, etc. At 1004, one or more perfusion parameter maps are generated from the image data. At 1006, a plausibility check is performed on at least one perfusion parameter map. At 1008, the at least one perfusion parameter map is corrected, if needed. At 1010, one or more parameters are corrected, for example, the threshold used when determining the core of the infarct, if needed. At 1012, one or more summary maps are generated from the perfusion parameter map(s) and parameter(s).

Figure 11:
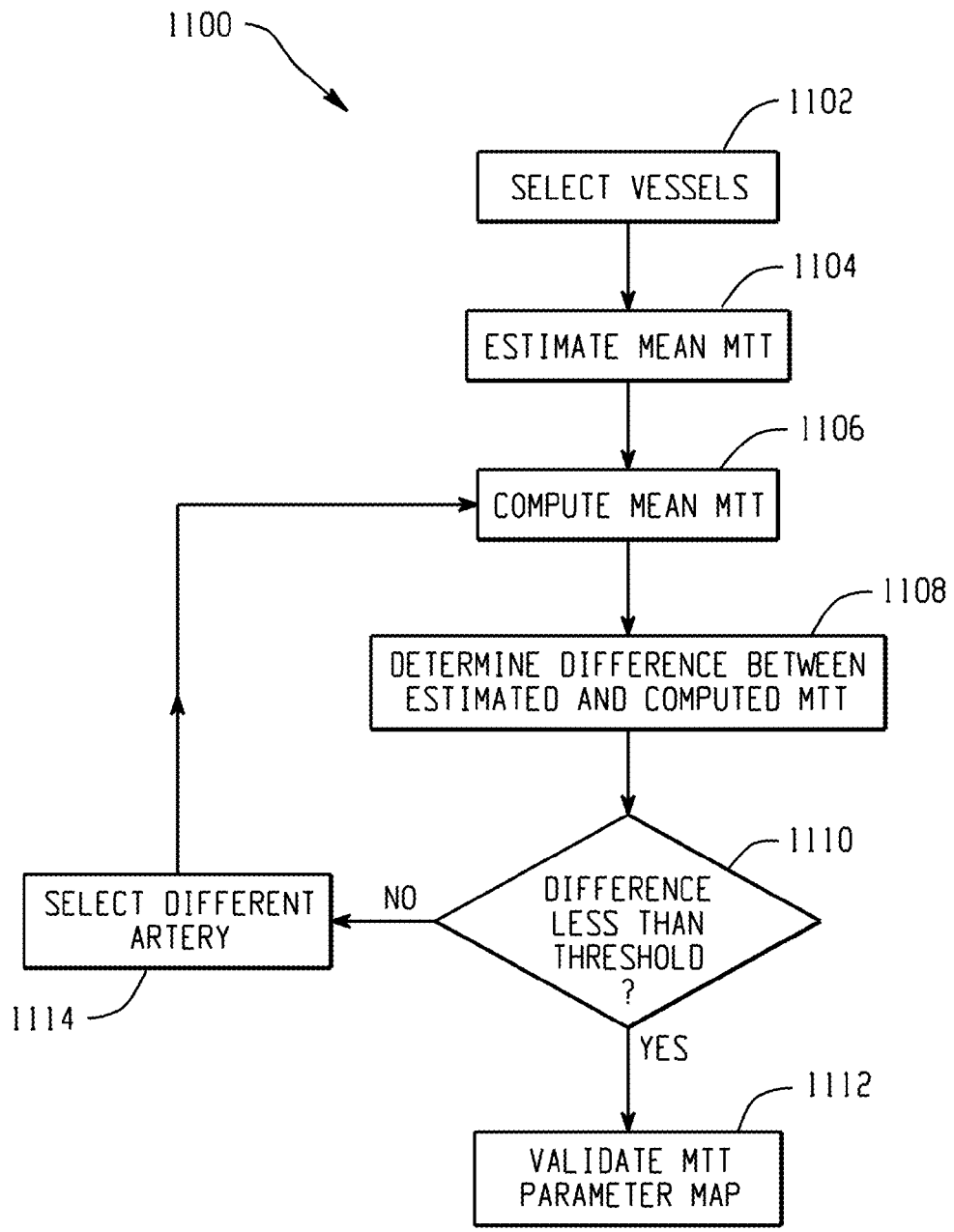
FIG. 11 illustrates an example method for validating a MTT map.

FIG. 11 illustrated a non-limiting method 1100 for validating a MTT map. At 1102, a reference artery and a reference vein in the brain are selected. At 1104, a mean MTT is estimated. At 1106, a mean MTT is computed based on the selected vessels. At 1108, the difference between the estimated and computed MTT is determined. At 1110, the difference is compared to a pre-set threshold value. If the difference is less than the threshold, then at 1112 the MTT parameter map is validated. If not, then at 1114, another artery is selected, and acts 1106 to 1110 are repeated. One or more iterations may be performed until a selected artery results in a difference that is less than the threshold. Other criteria may also be used to terminate the method 1100.

Figure 12:
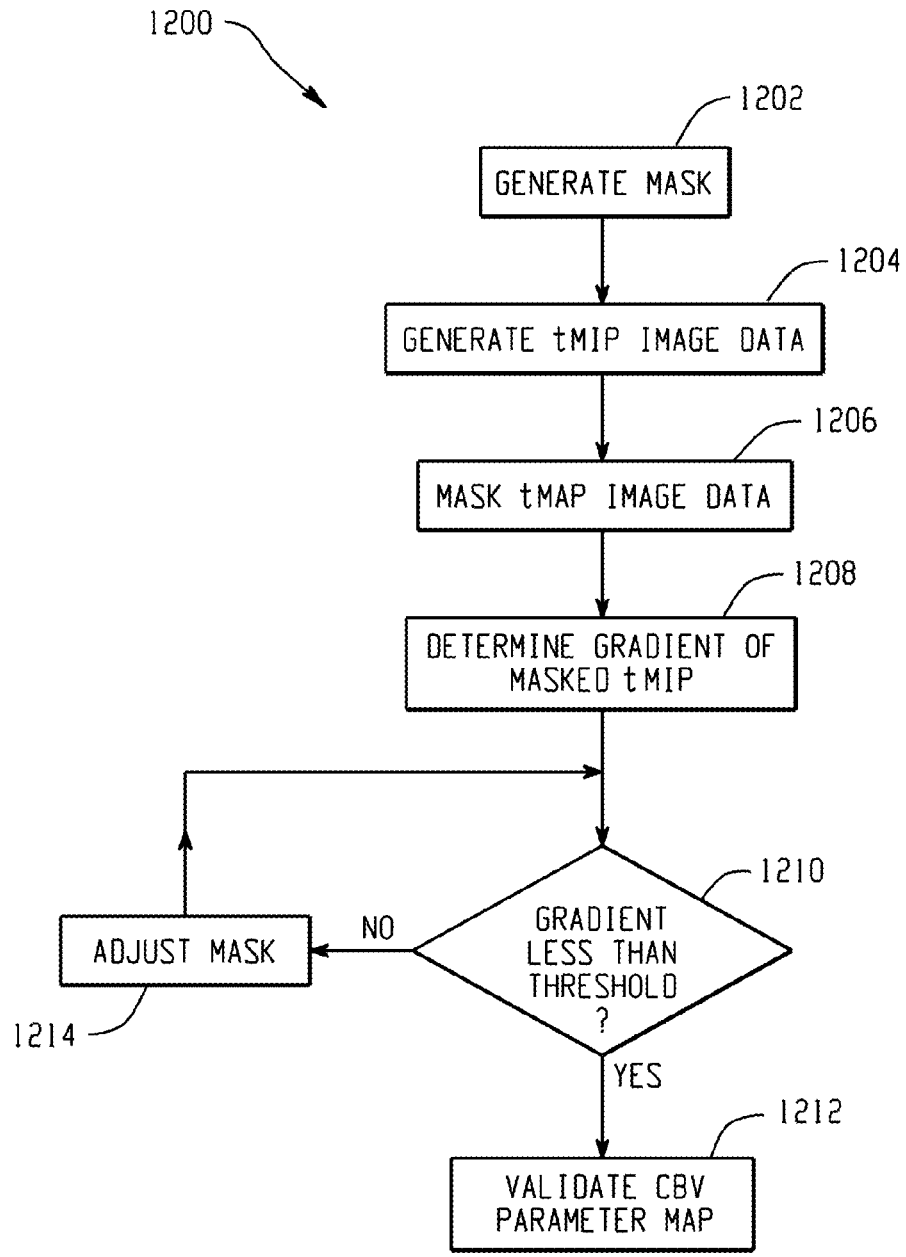
FIG. 12 illustrates an example method for validating a CBV map.

FIG. 12 illustrated a method 1200 for validating a CBV map. At 1202, a mask, representing a first of vessel to remove, is generated based on the CBV map. At 1204, temporal MIP (tMIP) image data is generated. At 1206, the tMIP image data is masked via the mask. At 1208, a mean gradient is determined based on the masked tMIP image data. At 1210, the mean gradient is compared with a pre-set threshold. If the mean gradient is less than the pre-set threshold, then at 1212 the CBV parameter map is validated. If not, then at 1214, the mask is adjusted and compared with the threshold again. As discussed herein, the mask may be adjusted by re-sizing the mask and/or changing the default segmentation threshold value. One or more iterations may be performed until gradient is less than the threshold, at which point, the CBV parameter map based on the corrected mask is validated. Other criteria may also be used to terminate the method 1200. As discussed herein, CTA data may be used in an alternative embodiment to validate and correct a CBV map.

Figure 13:
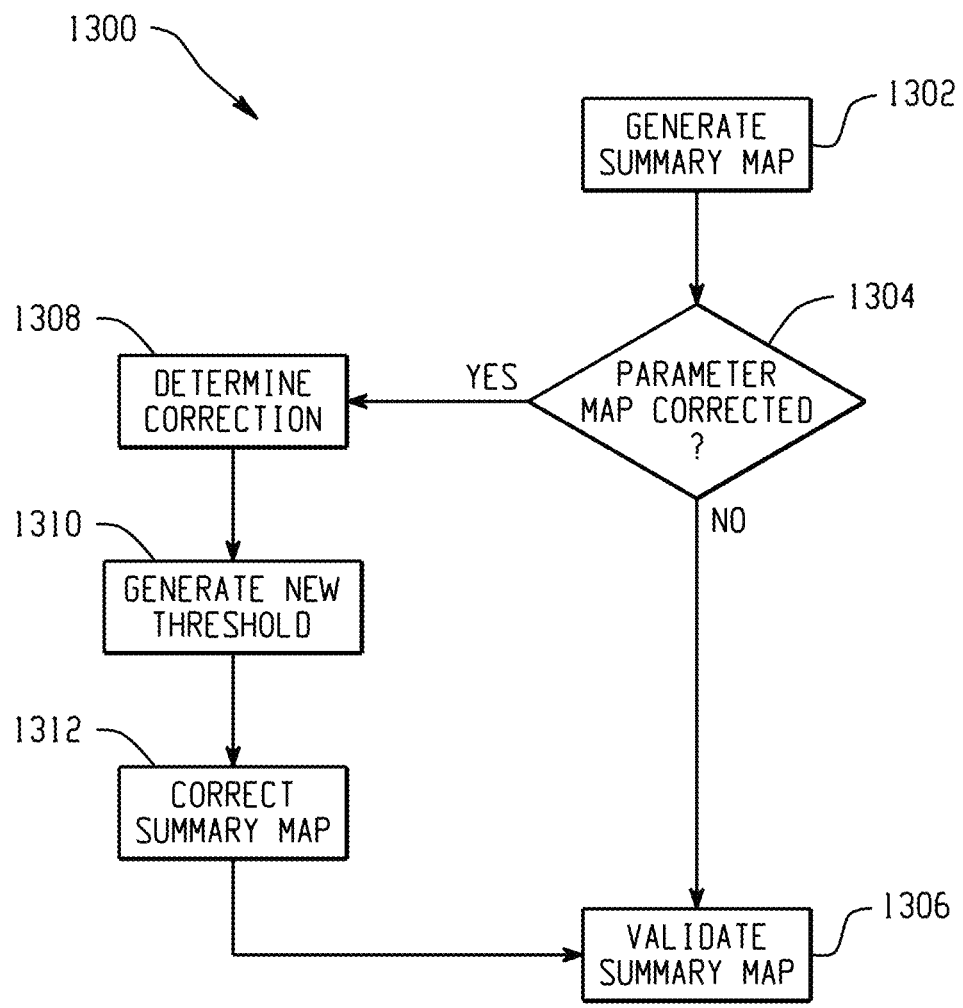
FIG. 13 illustrates an example method for validating a summary map.

FIG. 13 illustrated a method 1300 for validating a summary map. At 1302, a summary map is generated based on at least one parameter map. At 1304, it is determined whether the at least one parameter map was corrected. If not, then at 1306 the summary map is validated. Otherwise, at 1308 a correction factor is determined based on the corrected map. At 1310, a new threshold $Thresh_{CORE}$ is determined based on a correction factor. At 1312, the new threshold is used to correct the summary map.

The above may be implemented by way of computer readable instructions, which, when executed by a computer processor(s), causes the processor(s) to carry out the acts described herein. In such a case, the instructions are stored in a computer readable storage medium such as memory associated with and/or otherwise accessible to the relevant computer.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

We claim:

1. A method, wherein the perfusion parameter map is a CBV parameter map, and further including:
   determining a plausibility of one or more perfusion parameter maps generated based on perfusion image data;
   correcting at least one of the perfusion parameter maps when the plausibility for the at least one perfusion parameter map does not satisfy pre-set perfusion parameter plausibility criteria;
   obtaining temporal MIP (tMIP) image data;
   creating a vessel mask based on a default pre-set mask threshold;
   generating masked tMIP image data based on the tMIP image data and the mask;
   determining a feature value of the masked image;
   comparing the feature value with a pre-set CBV threshold; and
   validating the CBV parameter map only when the feature value is less than the pre-set CBV threshold.

2. The method of claim 1, wherein the feature value is a mean gradient of the masked image for a region of interest defined by the mask.

3. The method of claim 1, further including:
   correcting the CBV parameter map when the feature value is greater than the pre-set CBV threshold.

4. The method of claim 3, wherein correcting the CBV parameter map includes re-sizing the mask and repeating the steps of generating, determining, comparing and validating.

5. The method of claim 3, wherein correcting the CBV parameter map includes determining a corrected threshold for determining the mask.

6. The method of claim 1, wherein the perfusion parameter map is a CBV parameter map, and further including
   obtaining temporal MIP (tMIP) image data;
   creating a vessel mask based on a default pre-set mask threshold;
   generating masked tMIP image data based on the tMIP image data and the mask;
   generating masked CTA image data based on the CTA image data and the mask;
   comparing the masked tMIP image data and the masked CTA image data; and
   validating the CBV parameter map only when a difference between areas of the masked tMIP image data and the masked CTA image data is less than a pre-set area threshold.

7. The method of claim 1, further including:
   determining a summary map based on at least one of a corrected parameter map or a corrected parameter.

8. A system, comprising:
   a perfusion parameter map validator that corrects one or more perfusion parameter maps generated based on perfusion image data; and
   a summary map validator that corrects one or more summary maps generated based on the one or more perfusion parameter maps.

9. The system of claim 8, wherein the perfusion parameter map validator includes a MTT map validator, comprising:
   a MTT estimator that determines an estimated MTT based on contrast agent flow through vascular tissue;
   a MTT determiner that determines a MTT based on image data and a reference vessel in image data; and
   a MTT plausibility checker that determines a plausibility of the MTT map based on the estimated MTT.

10. The system of claim 9, further including a MTT generator that determines one or more subsequent MTT maps based one or more subsequent reference vessels in the image data when the plausibility does not satisfy MTT map plausibility criteria.

11. The system of claim 8, wherein the perfusion parameter map validator includes a CBV map validator, comprising:
    a feature determiner that determines a feature of a CBV parameter map;
    a CBV plausibility checker that determines a plausibility of the CBV map based on the feature.

12. The system of claim 11, further including;
    a tMIP processor that generates tMIP image data based on CTP image data;
    a segmentation component that determines a mask based on the tMIP image data, wherein the feature determiner determines the feature based on the CBV parameter map and the mask.

13. The system of claim 11, further including a CBV map corrector that determines a CBV map correction for the CBV map when a plausibility of the CBV map does not satisfy CBV map plausibility criteria, wherein the CBV map correction is used to correct the CBV map.

14. The system of claim 13, wherein the CBV map correction includes scaling a size of the mask.

15. The system of claim 8, the summary map validator, comprising:
    an error factor generator that determines a correction factor based on a corrected CBV map; and
    a threshold calculator that determines a threshold used to identify tissue of interest in a summary map, wherein the threshold is based on the correction factor.

16. The system of claim 15, wherein the tissue of interest is a core of an infarct.

17. A non-transitory computer readable storage medium containing instructions which, when executed by a computer, cause the computer to perform the steps of:
- determining a plausibility of at least one of a first perfusion parameter map generated based on perfusion image data or a summary map based on a second perfusion parameter map; and
- correcting the at least one of the first perfusion parameter map or the summary map when the at least one of the first perfusion parameter map or the summary map does not satisfy pre-set plausibility criteria.

* * * * *